(12) United States Patent
Manthei et al.

(10) Patent No.: US 10,844,781 B2
(45) Date of Patent: Nov. 24, 2020

(54) METHOD FOR OPERATING AN INTERNAL COMBUSTION ENGINE WITH A GAS MIXTURE SUPPLIED TO THE COMBUSTION AIR AND PRODUCED BY WATER ELECTROLYSIS, AND ASSEMBLY AND ELECTROLYSIS DEVICE FOR CARRYING OUT SAID METHOD

(71) Applicant: HMT HYDROMOTIVE GMBH, Berlin (DE)

(72) Inventors: Rainer Manthei, Nauen (DE); Marcus Schneider, Kirchdorf (DE); Gerhard Goebel, Berlin (DE); Gyoergy Toth, Zalaegerszeg (HU)

(73) Assignee: HMT HYDROMOTIVE GMBH, Berlin (DE)

( * ) Notice: Subject to any disclaimer, the term of this patent is extended or adjusted under 35 U.S.C. 154(b) by 134 days.

(21) Appl. No.: 15/779,093

(22) PCT Filed: Nov. 28, 2016

(86) PCT No.: PCT/DE2016/100557
§ 371 (c)(1),
(2) Date: Jul. 9, 2018

(87) PCT Pub. No.: WO2017/088858
PCT Pub. Date: Jun. 1, 2017

(65) Prior Publication Data
US 2018/0298813 A1    Oct. 18, 2018

(30) Foreign Application Priority Data
Nov. 26, 2015 (DE) .................. 10 2015 120 545

(51) Int. Cl.
*F02B 43/12* (2006.01)
*F02D 41/18* (2006.01)
(Continued)

(52) U.S. Cl.
CPC .............. *F02B 43/12* (2013.01); *F02B 47/06* (2013.01); *F02D 19/0671* (2013.01);
(Continued)

(58) Field of Classification Search
CPC ...... F02B 43/12; F02B 47/16; F02D 19/0671; F02D 41/0025; F02D 41/0027; F02D 41/18; F02M 25/12
See application file for complete search history.

(56) References Cited

U.S. PATENT DOCUMENTS 3,980,053 A    9/1976 Horvath
4,936,961 A    6/1990 Meyer
(Continued)

FOREIGN PATENT DOCUMENTS

CA    2870915 A1    7/2014
DE    102008003126 A1    2/2009
(Continued)

*Primary Examiner* — Kevin A Lathers
(74) *Attorney, Agent, or Firm* — Leydig, Voit & Mayer, Ltd.

(57) ABSTRACT

A method for operating an internal combustion engine using a gas mixture that is supplied to the fossil fuel in the engine combustion chamber in addition to the combustion air and is produced by the electrolysis of water includes measuring a quantity of air drawn into the intake tract of the engine in accordance with a particular engine operating mode. The method further includes directly supplying, to the combustion air per unit of volume of combustion air, a same, limited quantity of Brown's gas that acts as an additive, that is produced by means of an electrolyzer operated using a pulsating current, and that contains energy-enriched, gaseous water molecules. The percentage of the gas molecules present in the fuel during the combustion process is limited.

19 Claims, 3 Drawing Sheets

(51) Int. Cl.

| | | |
|---|---|---|
| *F02M 25/12* | (2006.01) | |
| *F02D 41/00* | (2006.01) | |
| *F02D 19/06* | (2006.01) | |
| *F02M 27/04* | (2006.01) | |
| *F02B 47/06* | (2006.01) | |
| *F02D 41/20* | (2006.01) | |
| *F02B 43/10* | (2006.01) | |

(52) U.S. Cl.
CPC ..... *F02D 41/0025* (2013.01); *F02D 41/0027* (2013.01); *F02D 41/18* (2013.01); *F02M 25/12* (2013.01); *F02M 27/04* (2013.01); *F02B 2043/106* (2013.01); *F02D 2041/2027* (2013.01); *F02D 2041/2034* (2013.01); *Y02E 60/36* (2013.01); *Y02T 10/30* (2013.01)

(56) References Cited

U.S. PATENT DOCUMENTS

| | | | |
|---|---|---|---|
| 6,155,212 A | 12/2000 | McAlister | |
| 7,793,621 B2 * | 9/2010 | Stehl | C10L 3/00 123/25 C |
| 2002/0189601 A1 | 12/2002 | Morrison et al. | |
| 2004/0074781 A1 * | 4/2004 | Klein | C25B 9/06 205/628 |
| 2010/0065419 A1 | 3/2010 | Richardson | |
| 2010/0175941 A1 | 7/2010 | Khodabakhsh | |
| 2011/0220516 A1 | 9/2011 | Finfrock et al. | |
| 2015/0361569 A1 * | 12/2015 | Mabie, Jr. | C25B 15/02 204/229.5 |

FOREIGN PATENT DOCUMENTS

| | | |
|---|---|---|
| DE | 102009026374 A1 | 2/2011 |
| EP | 2818581 A1 | 12/2014 |
| KR | 20030044602 A | 6/2003 |
| SG | 172123 A1 | 7/2011 |
| WO | WO 2006124805 A2 | 11/2006 |
| WO | WO 2007091105 A1 | 8/2007 |
| WO | WO 2007101329 A1 | 9/2007 |
| WO | WO 2010001086 A1 | 1/2010 |
| WO | WO 2010039283 A2 | 4/2010 |
| WO | WO 2013170309 A1 | 11/2013 |
| WO | WO 2015021385 A1 | 2/2015 |

* cited by examiner

METHOD FOR OPERATING AN INTERNAL COMBUSTION ENGINE WITH A GAS MIXTURE SUPPLIED TO THE COMBUSTION AIR AND PRODUCED BY WATER ELECTROLYSIS, AND ASSEMBLY AND ELECTROLYSIS DEVICE FOR CARRYING OUT SAID METHOD

CROSS REFERENCE TO RELATED APPLICATIONS

This application is a U.S. National Stage Application under 35 U.S.C. § 371 of International Application No. PCT/DE2016/100557 filed on Nov. 28, 2016, and claims benefit to German Patent Application No. DE 10 2015 120 545.9 filed on Nov. 26, 2015. The International Application was published in German on Jun. 1, 2017, as WO 2017/088858 A1 under PCT Article 21(2).

BACKGROUND

The invention relates to a method for operating an internal combustion engine using a gas mixture that is supplied to the combustion air and is produced by the electrolysis of water, and to an arrangement comprising an electrolyzer for carrying out the method.

BACKGROUND

In a method known from DE 10 2009 026 374 A1 for operating an internal combustion engine for motor vehicles using fossil fuel and a hydrogen-oxygen mixture (oxyhydrogen gas, Brown's gas) that is supplied to the combustion air in the intake tract of the engine and is produced in the vehicle by the electrolysis of water, the hydrogen-oxygen mixture is produced and temporarily stored during normal operation of the engine until a preset accumulator pressure is reached, and is only conducted to the intake tract of the engine in the event of high engine output when starting and accelerating the vehicle. The hydrogen is produced by means of a complex electrolyzer, which is supplied with water by a separate water tank and is connected to an additional alternator.

WO 2007/091105 describes the use of a hydrogen-oxygen mixture produced in the electrolyzer in an internal combustion engine that is operated using conventional fuel, either all or some of the fuel being temporarily replaced by the hydrogen-oxygen mixture produced in the vehicle when the load changes. WO 2007/101329 A1 discloses a method and a device for the hydrogen-assisted cold-starting of an internal combustion engine. In this case, the oxygen is intended to be separated out of the hydrogen-oxygen mixture produced in an electrolyzer. U.S. Pat. No. 6,155,212 A1 and WO 2006/124805 A2 also describe the additional use of hydrogen, which is produced and temporarily stored in the motor vehicle, for the combustion process.

An electrolyzer, which is known from DE 10 2008 003 126 A1, is directly connected to the combustion chamber of an internal combustion engine and produces a hydrogen-oxygen mixture that is to be admixed to the fuel, uses potassium hydroxide (KOH) as the electrolyte in order to improve the effectiveness of the electrolysis process. The electrolyzer comprises electrode plates that are uniformly spaced apart and are submerged in the electrolyte that is contained in a container. The two outer plates are connected to the negative or positive pole of the vehicle battery and the number of plates is set according to the voltage provided by the battery such that a voltage of approximately two volts is applied between two opposite electrode surfaces in order to carry out the electrolysis process.

SUMMARY

In an embodiment, the present invention provides a method for operating an internal combustion engine using a gas mixture that is supplied to the fossil fuel in the engine combustion chamber in addition to the combustion air and is produced by the electrolysis of water. The method includes measuring a quantity of air drawn into the intake tract of the engine in accordance with a particular engine operating mode; and directly supplying, to the combustion air per unit of volume of combustion air, a same, limited quantity of Brown's gas that acts as an additive, that is produced by means of an electrolyzer operated using a pulsating current, and that contains energy-enriched, gaseous water molecules. The percentage of the gas molecules present in the fuel during the combustion process is limited such that the energy-enriched, gaseous water molecules that are evenly distributed in the fuel-air mixture are only used as start or ignition nuclei that ignite the fuel for early and long-lasting intensive and complete combustion.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
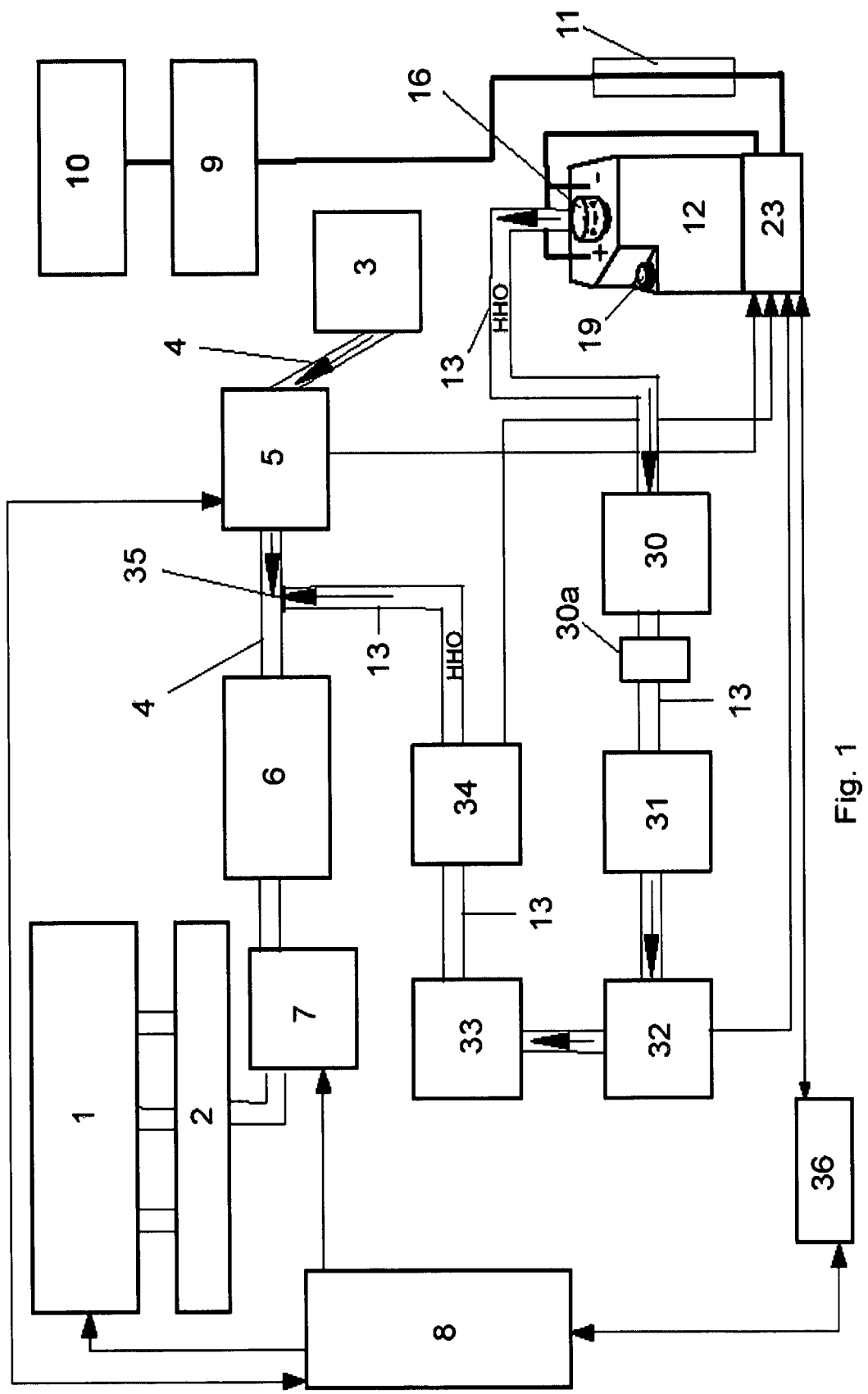
FIG. 1 shows an arrangement for operating an internal combustion engine using fossil fuel and a gas mixture consisting of hydrogen, oxygen and gaseous water (Brown's gas), which is supplied to the combustion air resulting from an electrolysis process.

Embodiments of the invention provide methods for operating an internal combustion engine using a gas mixture that is supplied to the combustion air and is produced by the electrolysis of water, and an arrangement and an electrolyzer for carrying out the method such that enough gas is produced for efficient fuel combustion using a small amount of equipment and energy, which gas is conducted to the engine combustion chamber so as to simultaneously reduce fuel consumption and pollutant emissions.

Embodiments of the invention provide methods for operating an internal combustion engine using a gas mixture that is supplied to the fossil fuel in the engine combustion chamber in addition to the combustion air and is produced by the electrolysis of water, the quantity of air drawn into the intake tract of the engine in accordance with the particular engine operating mode being measured and, per unit of volume of combustion air drawn in each time, the same, limited quantity of Brown's gas that merely acts as an additive, that is produced by means of an electrolyzer operated using a pulsating current and contains energy-enriched, gaseous water molecules, is always directly supplied to the combustion air, i.e. without being temporarily stored, the percentage of the gas molecules present in the fuel during the combustion process being limited such that the energy-enriched, gaseous water molecules that are evenly distributed in the fuel-air mixture are only used as start or ignition nuclei that ignite the fuel for early and long-lasting intensive and complete combustion.

A gas mixture produced by electrolyzing water is referred to as Brown's gas. It may contain additional products such as ozone and hydrogen peroxide in addition to hydrogen, oxygen and water molecules. The water molecules that are not separated are still enriched with energy immediately after the water electrolysis process and form, with their different spatial orientations, an isomer of the water molecule. They are also referred to as energetically charged hydroplasma. These energy-enriched water molecules or water isomers have limited stability and turn into conventional molecules when the gas is passed through a water bath or during storage, for example. The entire gas mixture produced by the electrolysis of water is preferably supplied to the combustion air. This gas mixture in particular also comprises the energy-enriched water molecules. This is preferably achieved by said gas mixture being supplied to the combustion air without being temporarily stored. As a result, a large fraction of energy-enriched water molecules, i.e. of the energetically charged hydroplasma, is maintained. In this case, the fraction of energy-enriched water molecules in the gas mixture produced by the electrolysis of water is preferably more than a fifth, preferably more than a quarter, particularly preferably more than a third.

The gas mixture is directly supplied to the combustion air. In particular, the gas mixture is not conducted through a water bath or is temporarily stored for no longer than 10 s, preferably no longer than 20 s, particularly preferably no longer than 60 s, in particular no longer than 180 s, particularly preferably no longer than 600 s after it has been produced. The gas mixture is therefore supplied to the combustion air immediately after the gas mixture has been produced by means of water electrolysis.

According to embodiments of the invention, when an internal combustion engine is operated using a gas mixture that is additionally supplied to the fossil fuel in the engine combustion chamber, is produced by an electrolyzer assigned to the internal combustion engine and is introduced into the combustion air, the quantity of air drawn into the intake tract of the engine is measured in accordance with the particular engine operating mode or the engine output, for example when idling, accelerating, etc., and, per unit of volume of combustion air drawn in each time, the same, limited quantity of Brown's gas that merely acts as an additive, that is produced by means of the electrolyzer using a pulsating current and contains hydrogen, oxygen and energy-enriched, gaseous water molecules, is always supplied to the combustion air without being temporarily stored, i.e. when the energy-rich and ignitable gaseous water molecules that are only temporarily stable are still being produced (also referred to as linear water isomers). In this case, the percentage of the gas mixture that is present in the fuel during the combustion process and produced electrolytically is limited such that the extent to which the hydrogen molecules distributed in the fuel-air mixture in the engine combustion chamber act as additional fuel to is insignificant, but on their own the energy-enriched, gaseous water molecules in the Brown's gas are used as start or ignition nuclei that quickly and explosively ignite the fuel for early and long-lasting intensive and complete combustion.

The fossil fuel (for example diesel or petrol) is used more efficiently solely due to the energy-enriched gaseous water molecules in the Brown's gas that only act as ignition nuclei such that the engine output can be improved, and fuel consumption and consequently the emission of pollutants can be reduced. Furthermore, the exhaust-gas temperature is further reduced (by −8 to −10%) and therefore also the nitric oxide and carbon dioxide emissions. The electrolysis process carried out according to embodiments of the invention for the continuous provision of the Brown's gas does not require a large amount of equipment or energy due to the production, which is controlled on the basis of the quantity of intake air, of a quantity of gas that is also limited, and due to the production of gas in the electrolyzer, which is increased by the pulsating current. The power consumption for the electrolysis process is minimized such that the electrical energy required—without an additional or larger alternator—can be supplied by the vehicle battery alone. The extremely low Brown's gas requirement of 0.05‰ to 0.5‰ preferably 0.05‰ to 0.2‰ per liter of intake air is also advantageous inasmuch as a small electrolyzer can constantly provide the quantity of gas required, without it being temporarily stored. The specific requirement is dependent on the size of the engine displacement, the number of cylinders, the speed and the load. With reference to the energy-enriched, gaseous water molecules (the energetically charged hydroplasma) as a component of the Brown's gas, the proportion thereof in said gas is preferably 0.015‰ to 0.06‰ per liter of intake air.

In another embodiment of the invention, the current pulses acting on the electrolyzer are rectangular or trapezoidal.

In an advantageous development, the current pulses for influencing the quantity of Brown's gas produced and in particular the number of energy-enriched, gaseous water molecules therein are generated either continuously or in intervals and with different amplitudes. The gas yield can also be influenced by the selection of the flank angle of the current pulse length.

In another embodiment of the invention, the current pulses are controlled on the basis of the temperature and concentration of the electrolyte and on the plate geometry and the spacing between the plates such that the system consisting of the electrode plates and electrolyte is operated in resonance. This causes the electrolyte to be washed around the plates and leads to the rapid removal of gas bubbles in the electrode plates and to the rapid removal of the gas bubbles and therefore also to an increase in the gas yield. A frequency of more than 1000 Hz is preferably selected, particularly preferably of more than 3,000 Hz, particularly preferably of more than 10 kHz, particularly preferably of more than 25 kHz, most particularly preferably of more than 50 kHz. Another frequency is preferably superposed, which is in the range between 43 kHz and the harmonics thereof (n=1 to 5). This can increase the yield of the isomer formed.

According to another feature of the invention, the quantity of Brown's gas produced in the electrolyzer is controlled depending on the particular engine operating mode and on the basis of the quantity of air that is supplied to the intake tract and is detected by an air mass measuring device in conjunction with the quantity of Brown's gas that is detected by a flowmeter and is actually produced by the electrolyzer. This means that essentially only so much Brown's gas is produced in the electrolyzer that is currently required in the particular engine operating mode, and therefore the current consumption is low and the vehicle battery capacity is not used any more than is required.

In another embodiment of the invention, the energy-enriched water molecules, which are bound in so-called Rydberg clusters in the form of an ionized gas, are used as a constituent of the Brown's gas since they render said gas electrically conductive and responsive to electromagnetic fields. This particular property of the Brown's gas preferably allows for additional energetic charging of the linear energy-enriched water molecules according to the magnetohydrodynamic principle. When the Brown's gas is passed through an electrostatic field (magnetic field energy), an additional surface charge (induction charge) is produced. The associated charge separation of the ion current leads to the conversion of thermal and kinetic energy into electrical field energy by the voltage increase, and a low-temperature plasma in the form of the energetically charged hydroplasma is produced, which is therefore considerably richer in energy.

According to embodiments of the invention, arrangements for carrying out a method are provided, the arrangements including an air supply line that proceeds from an air filter box and is connected to the engine combustion chamber of the internal combustion engine in order to supply a quantity of air that is adapted to the particular engine operating mode, is characterized in that a gas supply line that is connected to an electrolyzer that is supplied with power by means of a vehicle battery directly opens up into the air supply line, and an air mass measuring device for detecting the volume of air drawn in on the basis of the particular engine operating mode is integrated in the air supply line, upstream of where the gas supply line opens up therein, and, when viewed in the direction of flow, in the gas supply line there are integrated first a flowmeter for detecting the actual quantity of gas produced and a throttle valve for ultimately setting the volume of gas that is adapted to the quantity of air conveyed, each of which is connected to a first control device that is assigned to the electrolyzer and controls the generation of gas on the basis of the quantity of air drawn in and on the quantity of gas detected by means of a pulsating current which is transformed either continuously or in intervals by a modulator and has a variable frequency, amplitude, flank angle of gradient and duration.

In an arrangement according to an embodiment of the invention, a water separator, a water detector, a gas filter for cleaning the gas and a burnback arrestor, which is made of a gas-permeable ceramic material and prevents a flashback into the electrolyzer, are integrated in the gas supply line. The Brown's gas and the constituents thereof preferably flow through a magnetic field (electrostatic field) applied to the gas supply line before being introduced into the air supply line, as a result of which additional surface charging or induction charging of the linear water isomers is produced and the energetically charged hydroplasma is produced that has a considerably higher energetic charge.

In an embodiment of the invention, the first control device is connected to a main control device that is assigned to the internal combustion engine by means of a second control device. The first and second control devices can also be integrated in the main control device.

In another embodiment of the invention, the gas supply line opens up into the air supply line in order to swirl and uniformly distribute the gaseous water molecules contained in the gas flow in the intake air by means of a Venturi nozzle arranged downstream of the air mass measuring device. This preferably not only regulates the pressure and increases the surface area, but ensures that the volumetric flow rate of the energetically charged hydroplasma is already homogeneously mixed with the air drawn in.

In an advantageous development, the electrolyzer comprises a plurality of electrode plates that are arranged in parallel and at a spacing from one another in a housing that is filled with an electrolyte and are provided with apertures. The two outer electrode plates or alternatively one central electrode plate and the two outer electrode plates are connected to the positive or negative pole of the vehicle battery by means of the first control device. A gas collecting chamber that is delimited above the electrode plates by a housing cover and temporarily receives the Brown's gas produced can be connected to the gas supply line that leads to the air supply line by means of a cap that can be placed on a gas outlet connecting piece so as to seal it, automatically opens when a certain amount of overpressure prevails in the gas collecting chamber (approx. >0.1 bar) and comprises an internal tube piece, which receives a filter, and a gas connecting piece. The small, low-pressure gas reservoir above the electrode plates allows the energy-rich gaseous water molecules that are only temporarily stable to be swiftly supplied to the combustion air.

In one embodiment of the invention, the housing cover of the electrolyzer comprises a portion having a filling opening that can be sealed by a screw cap, which portion is lowered to the maximum electrolyte fill level in the housing. This means that the electrolyzer cannot be overfilled or the electrolytes cannot be excessively diluted, and a gas reservoir of a certain size is always available above the electrolytes.

In another embodiment of the invention, the electrode plates are fixed in position in grooves made in the base and in two opposite side walls of the housing and in the region of the upper edge of the electrodes.

In an advantageous development, the electrolyzer comprises a densitometer, a fill level measuring device, a temperature sensor and a pressure-relief valve for monitoring the electrolytes.

In one embodiment of the invention, the width of the electrode plates is much greater than the height thereof. As a result, a sufficiently large electrode surface area is covered with electrolyte for a long period of time, thus ensuring a long operating life of the electrolyzer without having to add electrolyte.

The electrode plate is approximately one millimeter thick and the electrode plates are spaced apart by between 1.5 and 10.5 millimeters. The electrolyte in the electrolyzer is preferably a 3.5 to 5.0% caustic potash solution.

In another embodiment of the invention, the electrolyte has a higher concentration in order to lower the freezing point during winter operation and/or contains up to a maximum of 10% ethylene glycol as an antifreezing agent.

The arrangement shown in FIG. 1 comprises, as a conventional component, an internal combustion engine (for example for a passenger car), which is only represented by the engine combustion chamber 1 here and the individual cylinders of which are connected by means of an inlet manifold 2 to the intake tract for the combustion air that is drawn in as a result of the movement of the piston. The intake tract substantially consists of an air supply line 4, which proceeds from an air filter box 3 and in which there are integrated an air mass measuring device 5 for detecting the volume of air that is drawn in on the basis of the engine operating mode in each case, and a turbocharger 6 for compressing the air and a throttle valve 7 for controlling the quantity of air that is supplied to the inlet manifold 2 in accordance with the engine output that is required in each case. The amount of fuel that is supplied to the engine combustion chamber 1 is controlled by a main control device 8 (OBD control device), which is assigned to the internal combustion engine and is connected to the air mass measuring device 5.

An alternator 10 that is connected to the vehicle batter 9 is coupled in the usual manner to the internal combustion engine in order to supply current to the electrical devices required for the internal combustion engine to operate and to any other electrical loads. The electrolyzer 12 described below is also operated by means of the current provided by the vehicle battery 9 by means of a safety device 11, with which a set quantity of Brown's gas (HHD) and in particular of the energy-enriched gaseous water (H—O—H) contained in the hydrogen-oxygen gas mixture at the start is continuously generated during operation of the internal combustion engine by means of electrolytic water decomposition, and is fed into the part of the air supply line 4 that is located between the air mass measuring device 5 and the turbocharger 6 by means of a gas supply line 13.

Figure 2:
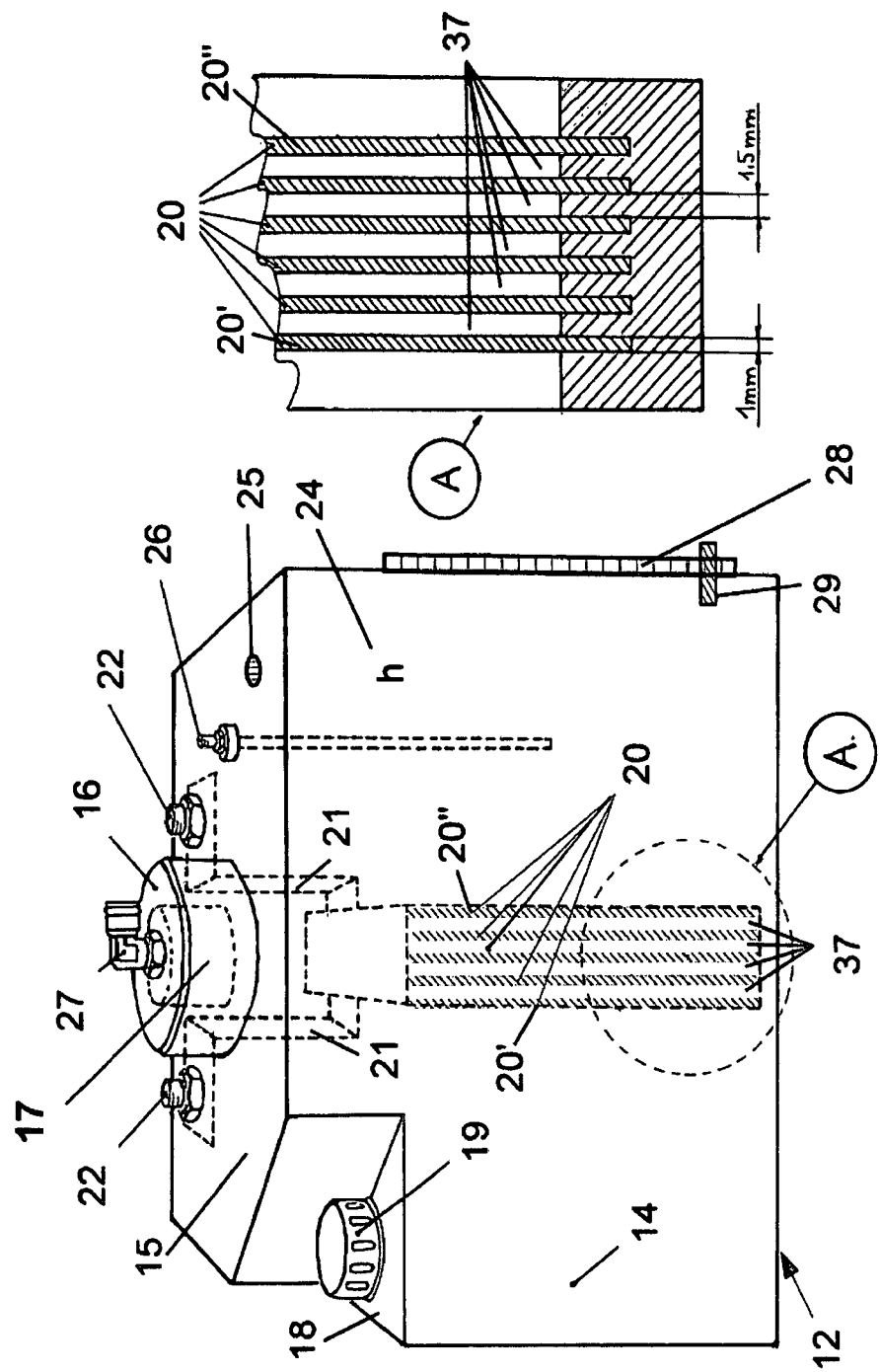
FIG. 2 shows an electrolyzer for generating Brown's gas (HHO) comprising a plate arrangement that is shown in detail.

The electrolyzer 12 shown in FIG. 2 comprises a closed housing 14 that is made of plastics material and comprises a gas outlet connecting piece that proceeds from the housing cover 15 and on which a cap 16 is placed, which sealed by means of an O ring (not shown in each case). A tube piece 17 that accommodates a filter (not shown) and extends into the gas outlet connecting piece proceeds from the horizontal inside of the cap 16, by means of which filter salt particles that have been carried along by the gas produced during electrolysis, water and water vapor are intended to be trapped. A gas connecting piece 27 attached to the cap 16 above the filter is connected to the gas supply line 13 shown in FIG. 1. The cap 16 can easily be removed by hand from the gas outlet connecting piece that is integrally formed on the housing cover 15 in order to clean the filter. The opening resistance of the cap 16 is limited to a low operating pressure of 0.1 bar.

In a portion 18 of the housing cover 15 that is moved downwards, i.e. in a plane that is lowered with respect to the housing cover and the gas outlet opening formed therein, a filling opening (not shown) is provided, which can be sealed by a screw cap 19, for the electrolytes, preferably a 3.5 to 5.0% caustic potash solution in this case, which are to be introduced into the housing 14 up to no higher than the level of the lowered portion 18 of the housing cover 1. Due to the maximum fill level h that is limited by said lowered portion, a specific minimum height is set for the gas reservoir in the gas collecting chamber 24 of the electrolyzer 12 and also prevents the electrolyte accidentally reaching the gas supply line 13 that leads to the intake tract of the engine.

Electrode plates 20 that are 1 mm thick in this case and are fixed in position in grooves (not shown) on the base and on two opposite side walls of the housing 14 and in the region of the upper edge of the plates, at a spacing of approximately 1 mm therefrom, are submerged in the electrolyte. The electrode plates 20 can therefore be easily assembled and disassembled in order to clean or replace them. The electrode plates 20 each comprise one or more holes (not shown), so that the chambers 37 formed therebetween are connected to one another and the electrolyte can flow therethrough. The two outer electrode plates 20', 20" are connected to the negative or positive pole of the vehicle battery 9, by means of a connecting line 21 and terminals 22 attached to the housing cover 15. In accordance with the battery voltage (for example 12-15 volts for passenger cars) and the number of electrode plates 20, a voltage of approximately two volts is applied in the chambers 37 formed between said plates in each case, which is optimum for the electrolysis process. The width of the electrode plates 20 is preferably greater than the height thereof such that—for an electrolyte that is to be used up gradually—the electrode plates 20 are submerged in the electrolyte to an adequate depth for a long period of time, and a sufficient amount of Brown's gas is produced without electrolyte having to be constantly added. A liter of electrolyte lasts for approximately 50 operating hours or up to 5000 kilometers in a 3 l diesel engine.

Figure 3:
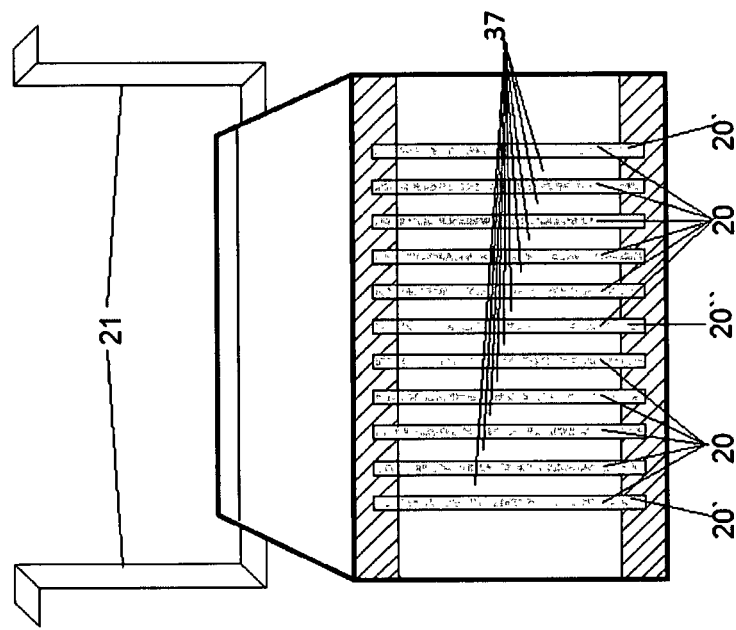
FIG. 3 shows another embodiment of the plate arrangement in the electrolyzer in more detail.

However, as shown in FIG. 3, it is also conceivable for a central electrode plate 20" to be connected to the positive pole of the vehicle battery and for the two outer electrode plates 20' to be connected to the negative pole such that the central anode and two outer cathodes and the electrode plates arranged therebetween ensure a larger electrode surface area and therefore a high gas production rate when the electrolyzer is compact.

As shown in FIG. 1, a first control device 23 comprising an integrated modulator (not shown) for converting the DC current supplied by the vehicle battery 9 into substantially rectangular current pulses is connected to the electrolyzer 12, which pulses vibrate the system consisting of the electrode plates 20 and the electrolytes located therebetween so that the small hydrogen, oxygen and water gas bubbles (Brown's gas) formed during electrolysis are removed from the electrode plates 20 more effectively by the movement of the entire system, and a maximum electrode surface area is therefore always available in the engine combustion chamber 1 for producing a high volume of Brown's gas as an additive for the fuel-air mixture. Due to the water molecules that are vibrated by the pulsating current, in addition to the electrolysis of water to form hydrogen and oxygen, a larger number of the water molecules contained in the electrolyte are also spread apart to form linear water isomers (H—O—H), i.e. the production of energy-enriched, gaseous water molecules as a constituent of Brown's gas is excited and assisted such that an additive, which is only required in small quantities but which has a considerably greater amount of energy than conventional oxyhydrogen gas, is available for the combustion process. The pulsating current and the vibrations generated thereby in the electrolysis system can be generated either constantly or at intervals of equal or different lengths and at different frequencies and amplitudes (current strength), in order to thus be able to influence the volume of gas produced and the structure of the gas during operation of the engine and in particular to provide the energy-rich Brown's gas. The gas production that is increased by the vibration of the electrolysis system allows the power consumption to be reduced and a high gas yield to be achieved nonetheless.

The electrolyzer 12 is equipped with a pressure-relief valve 25 (only shown schematically in FIG. 1) as an additional safety device (which opens under an operating pressure in the gas collecting chamber—>0.1 bar in this case), which is arranged in the gas collecting chamber 24 located above the particular electrolyte level.

At a gas pressure of <0.1 bar, the gas produced is directly forwarded and in particular the energy-rich gaseous water molecules that are only temporarily stable are still being produced in the intake tract. Further protection against the occurrence of an inadmissibly high pressure in the electrolyzer 12 is provided by the cap 16, which is merely held on the housing 14 by a plug connection and is removed from the gas outlet connecting piece that is integrally formed on the housing cover 15 when the gas pressure is too high. The concentration of potassium hydroxide in the aqueous electrolyte solution can be monitored by means of a densitometer 26 that protrudes into the electrolyte, whilst a fill level measuring device 28 can be used to determine the fill level in the housing 14 and the temperature of the electrolyte is indicated using a temperature sensor 29. At an operating temperature of from 60 to 65° C. and preferably a KOH proportion of from 3.5 to 5.0%, in conjunction with the pulsed current applied to the electrolyzer 12 and specifically at a current strength that is considerably lower than in conventional electrolyzers used in internal combustion engines, the quantity of gas produced is sufficient for the Brown's gas mixture to only act as an additive. The plate surface area required and the electrolyte consumption are comparatively low. The electrolyzer can therefore be small and compact and requires a small amount of maintenance. Due to the low current consumption, current can be supplied to the electrolyzer by means of the alternator of the vehicle that is connected to the vehicle battery. A signal initiated by the first control device indicates when the fill level or the KOH concentration or the temperature of the electrolyte is outside a preset range.

According to FIG. 1, first a water separator 30, a water detector 30a and a gas filter 31 for precipitating water vapor that is still in the Brown's gas and for separating salt particles are integrated in the gas supply line 13, which is connected to the air supply line 4, downstream of the electrolyzer 12. By means of a flowmeter 32, a burnback arrestor 33 and a throttle valve 34 that preferably comprises an electrostatic field (magnetic field) applied downstream thereof, the gas mixture finally reaches a Venturi nozzle 35 that directly opens up into the air supply line 4 downstream of the air mass measuring device 5 and upstream of the turbocharger 6. The main control device 8 that is connected to the internal combustion engine, the throttle valve 7 and to the air mass measuring device 5 is connected to the first control device 23 that is assigned to the electrolyzer 12 by means of a second control device 36 and is in turn electrically connected to the flowmeter 32, the air mass measuring device 5 and to the throttle valve 34.

The burnback arrestor 33 comprises a porous structure made of a sintered material, which prevents flashback of a flame generated by the combustion process in the engine compartment and the resultant ignition of the gas mixture stored in the gas reservoir of the electrolyzer. The throttle valve 34 connected to the first control device 23 ensures that, in the event of low motor output, for example when idling, and a correspondingly low gas removal rate due to the slight vacuum in front of the turbocharger 6, an excessive amount of gas does not reach the intake tract. The electrostatic field (magnetic field) that is preferably applied increases the surface charge (induction charge) of the already energized, linear water isomers, as a result of which additional field energy and an energetically charged hydroplasma is produced. Lastly, the Venturi nozzle 35 is tasked with intensively swirling the Brown's gas that is introduced into the air supply line 4 in the air drawn in via the air filter box 3, and distributing it very finely and uniformly.

The flowmeter 32, which is integrated in the gas supply line 13 downstream of the water separator 30 and the gas filter 31 and measures the quantity of gas produced in the electrolyzer 12 and transmits the measurement result to the control device 23 of the electrolyzer 12 also has an essential function in the entire system. Depending on the particular vehicle operating mode (idling, stop and go driving, speed, acceleration, etc.), the first control device 23 also obtains information from the air mass measuring device 5 relating to the quantity of air drawn in each time and from the main control device 8 and the second control device 36 relating to the vacuum in the intake tract and additional engine operating data. Lastly, the first control device 23 is also connected to the throttle valve 34 by means of a control line, so that a quantity of gas that is adapted to the quantity of air to be supplied in each case to the turbocharger or the engine combustion chamber depending on the particular engine operating mode is supplied to the intake tract and, per unit of volume of air drawn in by means of the Venturi nozzle 35, a defined quantity of gas of from 0.05‰ to 0.5‰, preferably from 0.05‰ 7‰ to 0.2 7‰ liters of intake air is always sprayed into the air supply line 4 and reaches the engine combustion chamber 1. Irrespective of the particular vehicle and engine operating mode, per unit of volume of combustion air drawn in, the fuel in the engine combustion chamber in each case always contains a certain percentage of Brown's gas that is the same, and therefore always contains a certain percentage of the energy-rich, gaseous water molecules that act as ignition nuclei.

The production of gas in the electrolyzer 12 is therefore substantially controlled by means of the engine speed (main control device), the quantity of intake air (air quantity measuring device), the quantity of gas that is actually produced (flowmeter) and the quantity of gas determined per unit of intake volume (throttle valve) together with the amplitude and structure of the current pulses generated. Only enough gas is therefore produced that is specifically required for the particular vehicle/engine operating mode in order to quickly ignite and fully combust the fossil fuel. This means the percentage of Brown's gas in a unit of intake volume is deliberately kept low and said gas does not traditionally act as an additional fuel, but merely has the function of an additive when provided in small amounts. This means that the gaseous water molecules that are uniformly distributed in the combustion chamber merely act as start nuclei or ignition nuclei, which accelerate and intensify ignition of the fuel-air mixture in the engine combustion chamber during the combustion cycle. The reaction energy that is released explosively ignites the fuel on a plurality of ignition hearths and ensures homogeneous and full combustion of the fuel introduced into the combustion chamber. The fuel is used more efficiently solely due to the gaseous water molecules of the Brown's gas that only act as ignition nuclei, and therefore the engine output is improved and fuel consumption and consequently the emission of pollutants can be reduced. Furthermore, the exhaust-gas temperature and therefore nitric oxide and carbon dioxide emissions are further reduced. Due to the controlled production of a limited quantity of gas, only a small amount of equipment and energy is required for the continuous provision of the Brown's gas.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 engine combustion chamber
2 inlet manifold
3 air filter box
4 air supply line
5 air mass measuring device
6 turbocharger
7 throttle valve
8 main control device
9 vehicle battery
10 alternator
11 safety device
12 electrolyzer
13 gas supply line
14 housing of 12
15 housing cover
16 cap of gas outlet connecting piece
17 tube piece of foam filter
18 sunken portion of 15
19 screw cap of electrolyte filling opening
20 electrode plates, (20', 20" outer electrode plates)
21 connecting line
22 terminals
23 first control device
24 gas collecting chamber, gas reservoir
25 pressure-relief valve
26 densitometer
27 gas connecting piece
28 fill level measuring device
29 temperature sensor
30 water separator, 30a water detector
31 gas filter
32 flowmeter
33 burnback arrestor
34 throttle valve
35 Venturi nozzle
36 second control device
37 chamber between 20

The invention claimed is:
1. A method for operating an internal combustion engine using a gas mixture that is supplied to the fossil fuel in the engine combustion chamber in addition to the combustion air and is produced by the electrolysis of water, the method comprising:
 measuring a quantity of air drawn into the intake tract of the engine in accordance with a particular engine operating mode; and
 directly supplying, to the combustion air per unit of volume of combustion air, a same, limited quantity of Brown's gas that acts as an additive, that is produced by means of an electrolyzer operated using a pulsating current, and that contains energy-enriched, gaseous water molecules,
 wherein the percentage of the gas molecules present in the fuel during the combustion process is limited such that the energy-enriched, gaseous water molecules that are evenly distributed in the fuel-air mixture are only used as start or ignition nuclei that ignite the fuel for early and long-lasting intensive and complete combustion, and
 wherein a quantity of Brown's gas produced in the electrolyzer is controlled depending on the particular engine operating mode and on a basis of a quantity of air that is supplied to the intake tract and is detected by an air mass measuring device in conjunction with a quantity of Brown's gas that is detected by a flowmeter and is actually produced by the electrolyzer.

2. The method as per claim 1, wherein current pulses acting on the electrolyzer are rectangular or trapezoidal.

3. The method according to claim 1, wherein current pulses for influencing both the gas yield and the number of energy-enriched, gaseous water molecules are generated either continuously or in intervals and with different amplitudes.

4. The method according to claim 1, wherein current pulses for influencing both the gas yield and the number of energy-enriched gaseous water molecules in the Brown's gas have a variable flank angle of gradient.

5. The method according to claim 1, wherein, in order to increase a Brown's gas yield, current pulses are controlled on a basis of a temperature and concentration of an electrolyte and on an electrode plate geometry and a spacing between plates such that a system consisting of the electrode plates and the electrolyte is operated in resonance so that the electrode plates can be separated and the electrolyte can be washed therearound.

6. The method according to claim 1, wherein directly supplying, to the combustion air per unit of volume of combustion air, a same, limited quantity of Brown's gas comprises supplying the Brown's gas without temporarily storing the Brown's gas in any storage tank.

7. The method as per claim 1, wherein a proportion of Brown's gas that is supplied to a liter of intake air is between 0.05 and 0.5 per thousand.

8. An arrangement for operating an internal combustion engine, comprising:
 an air supply line, which proceeds from an air filter box, connected to an engine combustion chamber of an internal combustion engine, the air supply line being configured to supply a quantity of air that is adapted to a particular engine operating mode,
 a gas supply line opening up into the air supply line, the gas supply line being connected to an electrolyzer, the electrolyzer being supplied with power by a vehicle battery
 an air mass measuring device configured to detect a volume of air drawn in on a basis of the particular engine operating mode, the air mass measuring device being integrated in the air supply line upstream of where the gas supply line opens up thereinto,
 wherein when viewed in a direction of flow in the gas supply line, there are integrated first a flowmeter for detecting the actual quantity of gas produced and a throttle valve for ultimately setting a volume of gas that is adapted to the quantity of air conveyed, each of which is connected to a first control device and is assigned to the electrolyzer and controls the generation of gas on a basis of the quantity of air drawn in and on a quantity of gas detected by means of a pulsating current which is transformed either continuously or in intervals by a modulator and has a variable frequency, amplitude, flank angle and duration.

9. The arrangement according to claim 8, wherein a water separator, a water detector, a gas filter for cleaning the gas and a burnback arrestor, which is made of a gas-permeable ceramic material and prevents a flashback into the electrolyzer, are integrated in the gas supply line.

10. The arrangement according to claim 8, wherein the first control device is connected to a main control device that is assigned to the internal combustion engine by a second control device.

11. The arrangement according to claim 8, wherein the gas supply line opens up into the air supply line in order to swirl and uniformly distribute molecules contained in the gas flow in the intake air by a Venturi nozzle arranged downstream of the air mass measuring device.

12. The arrangement according to claim 8, wherein the electrolyzer comprises a plurality of electrode plates that are arranged in parallel and at a spacing from one another in a housing that is filled with an electrolyte and are provided with apertures, and two outer electrode plates and/or one central electrode plate are connected to a positive or a negative pole of the vehicle battery by the first control device, a gas collecting chamber that is delimited above the electrode plates by a housing cover being connectable to the gas supply line by a cap that can be placed on a gas outlet connecting piece so as to seal it, automatically opens when a certain amount of overpressure prevails in the gas collecting chamber and comprises an internal tube piece, which receives a filter, and a gas connecting piece.

13. The arrangement according to claim 12, wherein the housing cover comprises a portion having a filling opening that can be sealed by a screw cap, which portion is lowered to a maximum electrolyte fill level in the housing.

14. The arrangement according to claim 12, wherein the electrode plates are fixed in position in grooves made in the base and in two opposite side walls of the housing and in the region of an upper edge of the plates.

15. The arrangement according to claim 12, wherein the electrolyzer comprises a densitometer, a fill level measuring device, a temperature sensor and a pressure-relief valve for monitoring the electrolytes.

16. The arrangement according to claim 12, wherein a width of the electrode plates is greater than a height thereof and therefore an electrode surface area is covered with electrolyte for a period of time.

17. The arrangement according to claim 12, wherein the electrode plate is one millimeter thick and the electrode plates are spaced apart by between 1.5 and 10.5 millimeters.

18. The arrangement according to claim 12, wherein the electrolyte in the electrolyzer is a 3.5 to 5.0% caustic potash solution.

19. The arrangement according to claim 18, wherein the electrolyte has a higher concentration in order to lower a freezing point during winter operation and/or contains up to a maximum of 10% ethylene glycol as an antifreezing agent.

\* \* \* \* \*